United States Patent [19]

Rullmann et al.

[11] Patent Number: 4,988,753
[45] Date of Patent: Jan. 29, 1991

[54] VULCANIZABLE BINDER DISPERSION COMPOSITION

[75] Inventors: Helmut Rullmann, Frankfurt am Main; Adolf Zellner, Mörfelden-Walldorf; Manfred Gebhard, Frankfurt am Main, all of Fed. Rep. of Germany

[73] Assignee: Metallgesellschaft Aktiengesellschaft, Frankfurt am Main, Fed. Rep. of Germany

[21] Appl. No.: 207,258

[22] Filed: Jun. 15, 1988

[30] Foreign Application Priority Data

Jun. 17, 1987 [DE] Fed. Rep. of Germany ....... 3720218

[51] Int. Cl.$^5$ .................. C08K 5/32; C08L 23/34; C08L 27/08
[52] U.S. Cl. .................... 524/260; 524/458; 524/501; 524/551; 524/552; 524/555; 525/221; 525/239; 525/240
[58] Field of Search ............... 524/552, 458, 555, 260, 524/501, 551; 525/221, 239, 240

[56] References Cited

U.S. PATENT DOCUMENTS 3,708,388 1/1973 Lindemann et al. .
4,119,587 10/1978 Jazenski et al. .
4,483,962 11/1984 Sadowski ............................ 524/552

FOREIGN PATENT DOCUMENTS 1719093 11/1978 Fed. Rep. of Germany .
1212404 11/1970 United Kingdom .

Primary Examiner—Joseph L. Schofer
Assistant Examiner—Thomas McDonald, Jr.
Attorney, Agent, or Firm—Herbert Dubno

[57] ABSTRACT

A bonding composition comprising an aqueous dispersion is described, which is used to bond natural and synthetic elastomers to metallic and nonmetallic substrates under vulcanizing conditions. Such dispersions contain an organic polymeric film-forming substance, an aromatic polynitroso compound, and a coactivator and optionally contain conventional adhesion promoters, fillers and processing aids. In order to widen the field of application and to ensure a high stability of the bond against corrosive influences, the coactivator particularly consists of phenylene bis-maleic acid imide, but one more of the following may be used: triallylcyanurate, triallylisocyanurate, diallylacrylamide, tetraallylterephthalamide, tris(1-methyl-2-propenyl) isocyanurate, trivinylisocyanurate, triallyltrimellitate, diallylphthalate, ethylene-glycoldimethacrylate, trimethylolpropanetrimethacrylate, and 1,3-butyleneglycol-dimethacrylate.

4 Claims, No Drawings

VULCANIZABLE BINDER DISPERSION COMPOSITION

FIELD OF THE INVENTION

Our present invention relates to a bonding composition for bonding natural and synthetic elastomers to metallic and nonmetallic substrates under vulcanizing conditions, which bonding composition comprises an aqueous dispersion, which contains an organic polymeric film-forming substance, an aromatic polynitroso compound and a coactivator and optionally contains conventional adhesion promoters, fillers and processing aids.

BACKGROUND OF THE INVENTION

Bonding compositions which contain organic solvents and serve to bond rubber to metals or other, nonmetallic, substrates under vulcanizing conditions have been known for a long time. They usually contain polymeric film-forming substances, one or more adhesion promoting cross-linking agents, fillers, pigments and processing aids. Owing to their content of organic solvents, such bonding compositions have disadvantages from the point of view of pollution, toxic behavior and inflammability.

Other bonding compositions are known which comprise aqueous dispersions containing organic polymeric film-forming substances as well as cross-linking agents, adhesion promoters, fillers, pigments and processing aids, which are dispersed or dissolved in water.

Published German Application No. DE-OS 26 54 352 discloses a bonding composition which comprises an aqueous polymer dispersion and serves to bond natural or synthetic rubber to metallic or nonmetallic substrates under vulcanizing conditions. The known bonding composition contains organic film-forming substances such as halogen-containing or chlorosulfonated rubber, also an aromatic polynitroso compound, such as dinitrosobenzene, adhesion promoters and a coactivator. The coactivator used in the known bonding composition is an organo-functional phosphonic acid or a partial ester of phosphoric acid and may consist, for example, of vinylphosphonic acid or phosphoric acid monoaminoethylester. The contact of toxic phosphorus compounds in such bonding compositions is a disadvantage in the handling thereof.

German patent publication No. DE-AS 17 19 093 discloses a bonding composition which comprises an aqueous vinyl acetate/ethylene copolymer latex. The bonding films are improved as regards solvent resistance and mechanical properties at high temperatures by the addition of a cross-linking agent, e.g. triallylcyanurate or glycidylacrylates.

U.S. Pat. No. 4,119,587 discloses a bonding composition which in a solvent contains a halogen-containing polymer, an aromatic nitroso compound, a lead salt of phosphoric acid or of an organic dicarboxylic acid as well as a maleinimide compound, particularly phenylene bismaleinimide. That known bonding composition also fails to avoid the disadvantages involved in the use of organic solvents, such as toxicity, inflammability and pollution.

The previously known aqueous bonding compositions have disadvantages residing in that they have no universal utility regarding the elastomers to be bonded and that they result in much lower bond strengths than solvent-containing bonding compositions.

OBJECT OF THE INVENTION

It is an object of the present invention to provide an aqueous bonding composition which has universal utility for the bonding of rubbers of various types to metallic and nonmetallic substrates under vulcanizing conditions and which is comparable in performance to the known solvent-containing bonding compositions and avoids their disadvantages relating to application technology.

DESCRIPTION OF THE INVENTION

A bonding composition for bonding natural and synthetic elastomers to metallic and nonmetallic substrates under vulcanizing conditions, according to the invention, comprises an aqueous dispersion, which contains an organic polymeric film-forming substance, an aromatic polynitroso compound and a coactivator and optionally contains conventional adhesion promoters, fillers and processing aids.

According to the invention, the coactivator is a co-reactive compound of the group consisting of triallylcyanurate and isocyanurate, diallylacrylamide, tetraallylterephthalamide, tris(1-methyl-2-propenyl) isocyanurate, trivinylisocyanurate, triallyltrimellitate, diallylphthalate, phenylene bis-maleic acid imide, ethyleneglycol dimethacrylate, trimethylolpropanetrimethacrylate, and 1,3-butyleneglycol dimethacrylate.

Those additives used in the bonding composition in accordance with the invention considerably improve the cross-linking of the organic film-forming substance and result in a higher bond strength between the natural or synthetic polymer and the substrate.

When the bond, e.g. between rubber and metal, is tested for tear strength, the failure occurs in the rubber in most cases.

The bonding composition in accordance with the invention is preferably an aqueous dispersion of a solid composition consisting of:
100 parts by weight organic polymeric film-forming substances,
5 to 100 parts by weight organic polynitroso compound,
5 to 100 coreactive compound of the group consisting of triallylcyanurate and isocyanurate, diallylacrylamide, tetraallylterephthalamide, tris(1-methyl-2-propenyl) isocyanurate, trivinylisocyanurate, triallyl trimellitate, diallylphthalate, phenylene-bis-maleic acid imide, ethyleneglycol-dimethacrylate, trimethylolpropanetrimethacrylate, and 1,3-butyleneglycoldimethacrylate, and 0 to 200 parts by weight adhesion promoter.

The organic polymeric film-forming substances which may be used in the binder composition in accordance with the invention include various polymers, which may be used individually or as a mixture, include, for instance, polymers and copolymers of polar compounds having ethylenic unsaturation, such as polyvinylformal, polyvinylacetate, chlorinated polyvinylchloride, copolymers of vinyl acetate and vinyl chloride, polyacrylic acid, polymethacrylic acid, copolymers of acrylic acid or methacrylic acid with conjugated dienes, such as 1,3-butadiene, 2-chloro-1,3-butadiene, 2,3-dichlorol,1,3-butadiene, and their posthalogenated products, also chlorosulfonated polyethylenes, brominated poly(2,3-dichloro-1,3-butadiene), copolymers of alpha-chloroacrylonitrile with 2,3-dichloro-1,3 butadiene, copolymers of alpha-bromoacrylonitrile with 2,3-dichloro-1,3-butadiene, also copolymers of vinylpyridine and conjugated dienes, inclusive of polyvalent reaction products thereof, halogen-containing rubbers or polychloroprene, chlorinated polychloroprene, natural rubber, poly-butadiene, polyethylene, etylene-propylene copolymer, also chlorinated ethylene-propylene heteropolymer with other dienes and chlorinated butadiene-styrene copolymers.

In practice, a mixture of chlorosulfonated polyethylene and of a copolymer of vinyl chloride, vinylidene chloride and acrylic acid has proved to be a particularly desirable film-forming substance. As a rule, the chlorosulfonated polyethylene owing to its Cl groups and $SO_2Cl$ groups contains about 25 to 43% chlorine and about 1 to 1.5% sulfur. The copolymer of vinyl chloride, vinylidene chloride and acrylic acid is an emulsion polymer consisting of:
8 to 33% by weight vinyl chloride,
65 to 90% by weight vinylidene chloride, and
2 to 15% by weight acrylate.

In the blend of the chlorosulfonated polyethylene and the above-mentioned copolymer, the latter may amount to as much as 50% by weight and preferably to 15 to 25% by weight, most preferably 20% by weight.

Suitable aromatic polynitroso compounds include compounds having one or more aromatic nuclei, to which two to four nitroso groups are bonded. These compounds may be provided at their nuclei with other substituents. Examples of suitable compounds are: m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-methoxy-1,3-dinitrosobenzene, 2-benzyl-1,4-dinitrosobenzene and 2-cyclo-hexyl-1,4-dinitrosobenzene.

The use of dinitrosobenzene or dinitrosonaphthalene is preferred in the bonding composition in accordance with the invention.

The compounds mentioned may include additional substituents attached to the nucleus. The nitroso compounds may be replaced by the corresponding oximes together with oxidants, such as vulcanization accelerators, chromate or dichromate, or the corresponding nitro compounds together with reducing agents, such as barium oxide, may be used.

The bonding composition in accordance with the invention, may also contain conventional adhesion promoters, such as carbon black, silica, calcium carbonate, oxides of the metals Al, Ca, Zn, Mg, Pb, Zr, also zirconium salts, e.g. zirconium aluminate, lead salts of inorganic and/or organic acids, e.g. basic lead carbonate, polyhydric alcohol, such as pentaerythritol, organic peroxides, e.g. dicumyl peroxide, organofunctional silanes, e.g. gammaaminopropyltriethoxysilane, and adhesion-promoting resins, e.g. phenol formaldehyde resins, individually or in mutual mixtures.

Preferred dispersing agents are used to form stable dispersions. They include addition products of alkylphenols, such as nonylphenol, and ethylene oxide, fatty alcohol or a fatty alcohol partial ester of phosphoric acid. The dispersion may additionally be stabilized with polyvinylalcohol or water-soluble colloids, such as methylcellulose, methylhydroxylpropylcellulose or hydroxyethylcellulose.

A preferred bonding composition in accordance with the invention comprises an aqueous dispersion of a solids composition consisting of:
100 parts by weight polymeric film-forming substances consisting of a mixture of chlorosulfonated polyethylene and vinyl chloride/vinylidene chloride/acrylic acid copolymer,
5 to 100 parts by weight p-dinitrosobenzene,
5 to 100 parts by weight phenylene bis-maleic acid imide,
0 to 100 parts by weight carbon black and basic lead carbonate.

Further preferred compositions are listed in the following Table (in parts by weight).

| Composition: | 1 | 2 | 3 | 4 | 5 |
|---|---|---|---|---|---|
| Polymeric film-substance consisting of a mixture of chloro-sulfonated poly ethylene and a copolymer of vinyl chloride, vinylidene chloride and acrylic acid | 100 | 100 | 100 | 100 | 100 |
| p-dinitrosobenzene | 5–100 | 5–100 | 5–100 | 5–100 | 5–100 |
| Phenylene bis-maleic acid imide | 5–100 | 5–100 | 5–100 | 5–100 | 5–100 |
| Carbon black and basic lead salt | 0–200 | 0–200 | 0–200 | 0–200 | 0–200 |
| Phenol formaldehyde resin | 0–80 | — | — | — | — |
| gamma-aminopropyl triethoxysilane | — | 0–20 | — | — | — |
| Zirconium oxide | — | — | 0–50 | — | — |
| Dicumyl peroxide | — | — | — | 0–20 | — |
| Pentaerythritol | — | — | — | — | 0–30 |

The bonding composition in accordance with the invention may be used to bond various types of rubber in a very wide o range under vulcanizing conditions, such as natural rubber, polychloroprene rubber, styrene-butadiene rubber, nitrile rubber, rubber comprising an ethylene-propylene copolymer or an ethylene-propylene-diene terpolymer.

The substrate may consist of metallic or nonmetallic materials, such as steel, stainless steels, which may have been surface-treated, e.g. phosphatized, also aluminum, copper, brass, bronze, nickel, zinc and their alloys, also nonmetallic materials, such as glass, woven fabrics made of glass fibers or of natural or synthetic organic fibers, also polyamides, polyacetals, polyesters and molding compositions consisting of phenolic resins.

The bonding composition in accordance with the invention contains between 12 and 40% by weight solids and has a viscosity of about 10 to 600 centipoise (Pa.s) and can be applied to the substrate surfaces conventional methods, such as brushing, spraying, dipping. After the coating has been applied and dried, the surfaces to be bonded are contacted with each other and the bond is formed under vulcanizing conditions.

Organic solvents may be co-used in minor amounts, which should not exceed 15%.

The advantages afforded by the bonding composition in accordance with the invention resides in that it can be prepared in a simple manner and has a long shelf-life and also has a universal utility for use with types of rubber within a wide range and substrate materials within a wide range and that the resulting bond has a high resistance to corrosive influences and to elevated temperatures and boiling water.

SPECIFIC EXAMPLES

The invention will be explained in more detail and by way of illustration in the following Examples:

EXAMPLE 1

(a) Preparation of the bonding composition in accordance with the invention

Bonding Composition A 100 parts by weight of an aqueous dispersion are prepared which contains 25% chlorosulfonated polyethylene and, as emulsifying agents contains 2 parts by weight of the sodium salt of the disproportionated abietic acid, 0.8 parts by weight nonylphenoxypolyethylene oxyethanol and 0.2 parts by weight hydroxyethylcellulose. 10 parts by weight of latex dispersion are added to that aqueous dispersion. The latex dispersion contains 50% of a copolymer of 8 to 33% by weight vinyl chloride, 65 to 90% by weight vinylidene chloride and 2 to 15% by weight acrylate. Added to the resulting dispersion is a finely ground further dispersion consisting of 100 parts by weight water, 12 parts by weight dinitrosobenzene, 8 parts by weight phenylene bis-maleic acid imide, 5 parts by weight carbon black and 6 parts by weight basic lead carbonate.

Bonding Composition B

The bonding composition B has the same composition as the bonding composition A, with the exception that 8 parts by weight phenylene-bis-maleic acid imide have been replaced by 9 parts by weight diallyl acrylamide.

(c) Bonding

The bonding composition which is ready for use is coated on abrasive-blasted and degreased test specimens which consist of steel plates, which have previously been primed with a conventional primer for bonding rubber to metal. The coated specimens were stored in room air for about one hour. The test specimens were then coated with the rubber I to IV described hereinafter and were subsequently vulcanized. The bond strength was tested after 24 hours.

I. Rubber Mix NR
100 parts by weight natural rubber
1 part by weight stearic acid
5 parts by weight zinc oxide
1 part by weight polymeric 2,2,4-trimethyl-1,-2-dihydroquinoline
40 parts by weight carbon black N-550
0.5 parts by weight N-cyclohexyl-2-benzothiazyl sulfenamide
2.5 parts by weight sulfur
Vulcanization conditions: 12 minutes at 160° C.

II. Rubber Mix SBR
100 parts by weight styrene-butadiene rubber
1 part by weight stearic acid
5 parts by weight zinc oxide
8 parts by weight aromatic oil
50 parts by weight carbon black N-330
1.2 parts by weight N-cyclohexyl-2-benzothiazylsulfenamide
0.2 parts by weight N-cyclohexyl thiophthalamide
1.6 parts by weight sulfur
Vulcanization conditions: 20 minutes at 160° C.

III. Rubber Mix NBR 100 parts by weight nitrile rubber (33% acrylonitrile)
1 part by weight stearic acid
5 parts by weight zinc oxide
5 parts by weight dioctylphthalate
45 parts by weight carbon black S-300
1.8 parts by weight N-cyclohexyl-2-benzothiazylsulfenamide
2 parts by weight sulfur
Vulcanizing conditions: 15 minutes at 150° C.

IV. Rubber Mix EPDM
00 parts by weight ethylene-propylene terpolymer rubber
1 part by weight stearic acid
5 parts by weight zinc oxide
50 parts by weight carbon black N-330
25 parts by weight carbon black N-400
0.5 parts by weight 1-mercaptobenzothiazole (MBT)
0.5 tetramethylthiuramdisulfide (TMTD)
1.5 parts by weight sulfur
Vulcanization conditions: 30 minutes at 160° C.

EXAMPLE 2

Test specimens consisting of steel plates to which various rubber mixes had been bonded by means of the bonding composition (A) and (B) prepared in accordance with the invention were subjected to bond strength tests. For comparison, an aqueous bonding composition (C) which contained vinylphosphonic acid as a coactivator, and a bonding composition (D), which contained no coactivator, were also tested. The results ar stated in Table 1.

TABLE 1

| Rubber Mix | Bonding Composition A | | Bonding Composition B | | Bonding Composition C | | Bonding Composition D | |
|---|---|---|---|---|---|---|---|---|
| | Bond Strength (MPa) | Fracture Pattern (% R) | Bond Strength (MPa) | Fracture Pattern (% R) | Bond Strength (MPa) | Fracture Pattern (% R) | Bond Strength (MPa) | Fracture Pattern (% R) |
| NR | 9.4 | 100 | 9.2 | 100 | 7.5 | 65 | 7.0 | 60 |
| SBR | 9.2 | 100 | 9.0 | 100 | 7.0 | 60 | 6.5 | 55 |
| NBR | 9.6 | 100 | 9.0 | 100 | 7.5 | 70 | 6.8 | 70 |
| EPDM | 7.0 | 85 | 6.5 | 80 | 4.2 | 35 | 3.2 | 25 |

EXAMPLE 3

Peel strength test strips as specified in DIN 53531 were coated in the manner described hereinbefore with the bonding composition prepared in accordance with the invention and a natural rubber mix was vulcanization-bonded to the coating. The resulting rubber-metal parts were stored in a salt spray environment as specified in DIN 53167. The bond strength was tested after various storage times. The results are stated in Table 2.

TABLE 2

| Storage time in Salt Spray Environment (HOURS) | Bonding Composition A | | Bonding Composition B | |
|---|---|---|---|---|
| | Bond Strength (N/mm) | Fracture Pattern (% R) | Bond Strength (N/mm) | Fracture Pattern (% R) |
| 0 | 12 | 100 | 8 | 80 |
| 168 | 12 | 95 | 8 | 80 |
| 288 | 11 | 95 | 8 | 75 |
| 456 | 11 | 90 | 7 | 75 |

We claim:

1. A bonding composition for bonding natural and synthetic elastomers to metallic and nonmetallic substrates under vulcanizing conditions said bonding composition in an aqueous dispersion consisting essentially of:
    100 parts by weight organic polymeric film-forming substance which is a mixture of chlorosulfonated polyethylene and vinyl chloride/vinylidene chloride/acrylic acid copolymer;
    5 to 100 parts by weight organic polynitroso compound;
    5 to 100 parts by weight coreactive compound selected from the group consisting of diallyl acrylamide and phenylene bis-maleic acid imide;
    0 to 200 parts by weight adhesion promoter; and
    which dispersion also contains as optional constituents conventional promoters, fillers and processing aids.

2. The bonding composition defined in claim 1 wherein the aromatic polynitroso compound is p-dinitrosobenzene.

3. The bonding composition defined in claim 1 which contains as an adhesion promoter carbon black, silica, calcium carbonate, oxides of the metals Al, Ca, Zn, Mg, Pb, Zr, zirconium salts, lead salts of inorganic or organic acids, organic peroxides, polyhydric alcohols, organo-functional silanes, phenol-formaldehyde resins individually or as a mixture.

4. The bonding composition defined in claim 1 which comprises an aqueous dispersion of a solids composition consisting of:
    100 parts by weight polymeric film-forming substance consisting of a mixture of chlorosulfonated polyethylene and vinyl chloride/vinylidene chloride/acrylic acid copolymer;
    5 to 100 parts by weight p-dinitrosobenzene
    5 to 100 parts by weight phenylene bis-maleic acid imide; and
    0 to 100 parts by weight carbon black and basic lead salt.

* * * * *